(12) United States Patent
Couillard

(10) Patent No.: US 7,328,348 B2
(45) Date of Patent: Feb. 5, 2008

(54) METHOD AND SYSTEM FOR SECURELY TIMESTAMPING DIGITAL DATA

(75) Inventor: Bruno Couillard, Gatineau (CA)

(73) Assignee: SafeNet, Inc., Belcamp, MD (US)

( * ) Notice: Subject to any disclaimer, the term of this patent is extended or adjusted under 35 U.S.C. 154(b) by 1156 days.

(21) Appl. No.: 09/919,958

(22) Filed: Aug. 2, 2001

(65) Prior Publication Data
US 2003/0028778 A1 Feb. 6, 2003

(51) Int. Cl.
*H04L 9/00* (2006.01)
*G06F 11/26* (2006.01)

(52) U.S. Cl. .................. 713/178; 380/277; 714/25
(58) Field of Classification Search ............. 713/178; 714/25; 380/277
See application file for complete search history.

(56) References Cited

U.S. PATENT DOCUMENTS

| | | | |
|---|---|---|---|
| 5,001,752 A * | 3/1991 | Fischer ....................... | 713/178 |
| 5,923,763 A | 7/1999 | Walker et al. | |
| 5,949,879 A * | 9/1999 | Berson et al. .............. | 713/179 |
| 5,956,404 A * | 9/1999 | Schneier et al. ........... | 713/180 |
| 5,966,446 A * | 10/1999 | Davis ........................ | 713/178 |
| 6,457,126 B1 * | 9/2002 | Nakamura et al. .......... | 713/166 |
| 6,466,048 B1 * | 10/2002 | Goodman ..................... | 326/8 |

FOREIGN PATENT DOCUMENTS

| | | |
|---|---|---|
| EP | 0 422 757 A2 | 4/1991 |
| WO | WO 92/12485 A1 | 7/1992 |

OTHER PUBLICATIONS

Menezes et al, "Handbook of Applied Cryptography", 1996, p. 494.*

Geng-Sheng Kuo et al., "Predictable Timestamp Synchronized Clocks in a Network", Information Theory, 1994, Proceedings., 1994 IEEE Int'l Symposium on Trondheim, Norway Jun. 27-Jul. 1, 1994, New York, NY.

* cited by examiner

*Primary Examiner*—Gilberto Barron
*Assistant Examiner*—Michael Pyzocha
(74) *Attorney, Agent, or Firm*—Drinker Biddle & Reath LLP

(57) ABSTRACT

A method and system for securely timestamping digital data is disclosed. A secure encryption key is provided within a timestamping module. The timestamping module comprises a processor for performing security functions with the secure encryption key. The processor is operable in a first mode wherein the secure encryption key is used for encryption operations and for test operations and in a second mode in which the secure encryption key is only used for timestamping operations. Once the processor performs a function with the secure encryption key in the second mode it is precluded from performing further functions in the first mode with the secure encryption key. After the processor has been placed in the second mode of operation a unique code for being embedded within timestamped digital data is generated. Data indicative of a real time a request for a timestamping operation has been received is then provided to the processor from a real time clock. Based on the data indicative of a real time a timestamp is generated using the secure encryption key. The timestamp is embedded within the digital data and the unique code is inserted within the digital data. The digital data with the inserted data therein are then encoded to form timestamped digital data. Upon receipt of the securely timestamped digital data the unique code is retrieved from the securely timestamped digital data in order to verify the authenticity of the time data.

23 Claims, 9 Drawing Sheets receiving securely timestamped digital data, wherein the securely timestamped digital data have a unique code embedded therein, and wherein the unique code has been generated by a processor after the processor has been placed in a mode of operation in which a secure encryption key is only used for timestamping operations

decrypting the timestamp using a key corresponding to the secure encryption key for providing time data in dependence thereupon

retrieving the unique code from the securely timestamped digital data

comparing the unique code with reference data in order to produce a comparison result, and if the comparison result is indicative of a match indicating authenticity of the time data

Fig. 4

METHOD AND SYSTEM FOR SECURELY TIMESTAMPING DIGITAL DATA

FIELD OF THE INVENTION

The invention relates generally to timestamping of digital data, and in particular to a method and system for securely timestamping of digital data.

BACKGROUND OF THE INVENTION

The Internet is one of the fastest growing and ubiquitous modes of commerce. Many companies have Internet servers prepared for commercial delivery of goods and services. At first, the products found on the Internet or more specifically, the world wide web (WWW) were computer-based products, but today, more and more businesses are competing to set up commercial services on the world wide web.

In many situations there is a need to establish the date on which a document was created and to prove that the text of a document in question is in fact the same as that of the original dated document. A traditional solution to this problem is to use a notary public. Traditional notarization is time-consuming, requires the physical presence of a licensed notary, does not detect many kinds of document tampering, and provides security relying solely on the integrity of the notary.

The increasingly widespread use of electronic documents, which include digital representations of readable text but also of video, audio, and pictorial data, now poses a serious challenge for establishing the date of any such document. Furthermore, the authentication of documents in a digital data format is achieving a greater significance in that it is becoming relatively common to exchange digital documents between parties to a transaction. For example, using Electronic Document Interchange (EDI) many companies now exchange purchase orders, invoices or similar documents electronically. However, if a dispute arises as to what was transmitted as opposed to what was received it is difficult to establish which version of a document is correct and/or has precedence in time. As a result, many EDI transactions having any monetary significance are normally confirmed with physical documents to provide a paper audit trail. However, reducing documents to physical form defeats in large measure the advantages of EDI.

Techniques for timestamping documents in digital data format are known in the art. For example, techniques for timestamping documents in digital data format are disclosed in U.S. Pat. No. 6,188,766 issued to Kocher Feb. 13, 2001, U.S. Pat. No. 5,136,647 issued to Haber et al. Aug. 4, 1992, U.S. Pat. No. 5,022,080 issued to Durst et al. Jun. 4, 1991 and U.S. Pat. No. 5,001,752 issued to Fischer Mar. 19, 1991, which are incorporated hereby for reference. All these techniques are based on the steps of providing a document, hashing the document, providing time data and encrypting the hashed document with the time data using an encryption key of a timestamping module. When the encrypted data is decrypted it verifies the timestamp as accurate.

However, these techniques are prone to tampering during test of a timestamp module or before a key is designated for timestamping purposes only. For example, if there is a secure key for use in encryption stored within a module false time data could be passed along with a document. The document is hashed and the time data and the document are encrypted with the key. The result looks like a timestamp. If that key later becomes a timestamping key or is set to timestamping by a dishonest person tampering with the module there is no guarantee that a timestamp is authentic.

Therefore, in an attempt to overcome these security risks of the prior art, it is an object of the invention to provide a method for secure timestamping of digital data.

It is further an object of the invention to provide a method and system for securely timestamping digital data.

SUMMARY OF THE INVENTION

In accordance with the present invention there is provided a method for securing timestamping of digital data comprising the steps of:

providing a secure encryption key;

providing a processor for performing security functions with the secure encryption key, the processor operable in a first mode wherein the secure encryption key is used for encryption operations and in a second mode in which the secure encryption key is only used for timestamping operations, wherein once the processor performs a function with the secure encryption key in the second mode, it is precluded from performing further functions in the first mode with the secure encryption key;

receiving a request to perform a timestamping operation;

placing the processor in the second mode of operation once the request is received;

generating a unique code for being embedded within timestamped digital data, the unique code being indeterminable before receipt of the request; and, inserting the unique code within each timestamped digital data.

In accordance with the present invention there is further provided a method for securely timestamping digital data comprising the steps of:

providing a secure encryption key;

providing a processor for performing security functions with the secure encryption key, the processor operable in a first mode wherein the secure encryption key is used for encryption operations and for test operations and in a second mode in which the secure encryption key is only used for timestamping operations, wherein once the processor performs a function with the secure encryption key in the second mode, it is precluded from performing further functions in the first mode with the secure encryption key;

when the processor is in the first mode of operation, receiving a first request to perform a timestamping operation on first digital data and then placing the processor in the second mode of operation; and generating a unique code for being embedded within timestamped digital data, the unique code being indeterminable before receipt of the first request.

In accordance with the present invention there is further provided a method for securely timestamping digital data comprising the steps of:

receiving from a real time clock data indicative of a real time the first request for a timestamping operation has been received;

generating a first timestamp based on the data indicative of real time using the secure encryption key;

embedding the first timestamp within the first digital data and inserting the unique code within the first digital data; and encoding the first digital data with inserted data therein to form timestamped digital data.

In accordance with the present invention there is further provided a receiving a second request to perform a timestamping operation on second digital data;
    receiving from the real time clock data indicative of a real time the second request for a timestamping operation has been received;
    generating a second timestamp based on the data indicative of a real time using the secure encryption key;
    embedding the second timestamp within the second digital data and inserting the unique code within the second digital data; and
    encoding the second digital data with inserted data therein to form timestamped digital data.

In accordance with an aspect of the present invention there is provided a method for securely timestamping digital data comprising the steps of:
    receiving securely timestamped digital data, wherein the securely timestamped digital data have a unique code embedded therein, and wherein the unique code has been generated by a processor after the processor has been placed in a mode of operation in which a secure encryption key is only used for timestamping operations;
    decrypting the timestamp using a key corresponding to the secure encryption key for providing time data in dependence thereupon;
    retrieving the unique code from the securely timestamped digital data; and,
    comparing the unique code with reference data in order to produce a comparison result, and if the comparison result is indicative of a match indicating authenticity of the time data.

In accordance with another aspect of the present invention there is provided a secure system for securely timestamping digital data comprising:
    at least a first port for receiving the digital data and for providing timestamped digital data; and
    a processor for:
    performing security functions with the secure encryption key, the processor operable in a first mode wherein a secure encryption key is used for encryption operations and for test operations and in a second mode in which the secure encryption key is only used for timestamping operations, wherein once the processor performs a function with the secure encryption key in the second mode, it is precluded from performing further functions with the secure encryption key in the first mode; and,
    for inserting in the second mode a unique code for being embedded within the timestamped digital data, the unique code being indeterminable outside the system before the processor is placed in the second mode, within the timestamped digital data.

BRIEF DESCRIPTION OF FIGURES

Exemplary embodiments of the invention will now be described in conjunction with the following drawings, in which:

FIG. 4 is a simplified flow diagram of a method for securely timestamping digital data according to the invention; and, FIG. 5 is a simplified block diagram of a system for securely timestamping digital data according to the invention.

DETAILED DESCRIPTION OF PREFERRED EMBODIMENTS

Prior art timestamping techniques are based on the steps of providing a document, hashing the document, providing time data and encrypting the hashed document with the time data using an encryption key of a timestamping module. When the encrypted data is decrypted it verifies the timestamp as accurate. However, these techniques are prone to tampering. For example, a dishonest person provides a document together with false time data for encryption using the encryption key of the timestamping module. The document is hashed and the time data and the document are encrypted with the key. If a recipient decrypts these data it appears as a valid timestamp using the secure key of the module. Furthermore, if that key is later used for timestamping, there is no guarantee that a timestamp is authentic.

Figure 1:
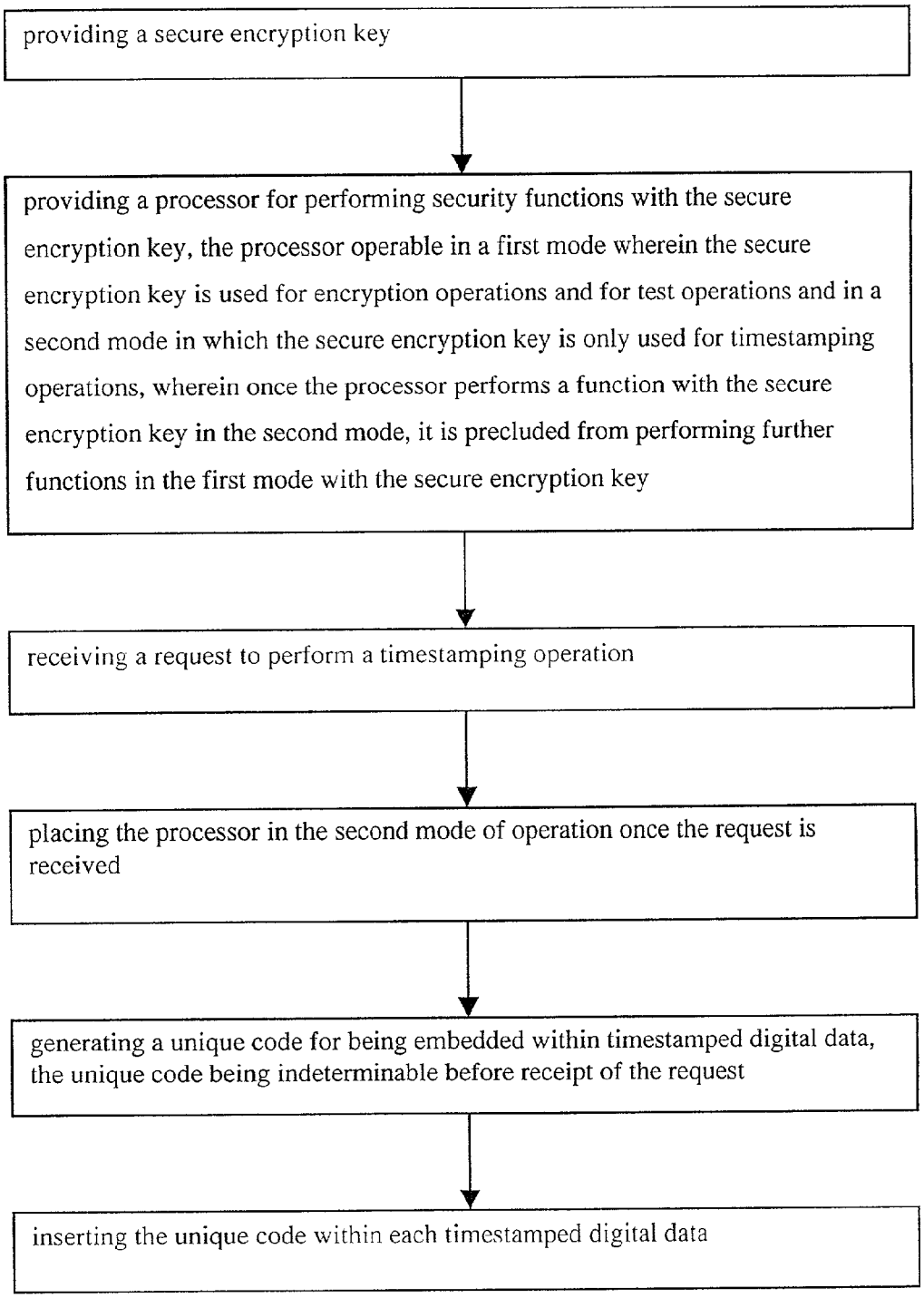
FIG. 1 is a simplified flow diagram of a the method for securing timestamping of digital data according to the invention.

The drawbacks of the prior art as described above are overcome by the method for securing timestamping of digital data according to the invention illustrated in FIG. 1. In the following disclosure the expression "digital data" refers to any type of document available as an electronic file for processing using a digital processor. Such electronic files are, for example, readable text files, audio files, video files, picture data files, electronic data, database entries, transaction records, system records, etc. A secure encryption key is provided within a timestamping module. The timestamping module comprises a processor for performing security functions with the secure encryption key. The processor is operable in a first mode wherein the secure encryption key is used for encryption operations and for test operations and in a second mode in which the secure encryption key is only used for timestamping operations. In order to secure the timestamping the processor is precluded from performing further functions in the first mode with a secure encryption key once the processor performs a function with the same secure encryption key in the second mode. For instance, when the processor receives a request to perform a timestamping operation using a first key, the processor places itself in the second mode of operation with respect to the first key precluding the processor from performing further functions in the first mode with the first key.

This provides secure timestamping. Since the first timestamp operation time is known, it is impossible to falsify timestamps by encrypting digital data with time data dated backward in time. All timestamps indicate a time being equal or later than the time instance when the processor has been placed in the second mode of operation with respect to the first key. Therefore, timestamps indicating a time before the time instance when the processor has been placed in the second mode of operation with respect to the first key and using the same first key are false. This allows verification of authenticity of a timestamp by comparing the time indicated by the timestamp with the time instance the processor has been placed in the second mode with respect to the key used to create the timestamp.

However, it is still possible to falsify timestamps by encrypting digital data with time data dated forward in time.

In order to render also this possibility futile an exemplary method for securing timestamping of digital data according to the invention comprises the additional step of generating a unique code associated with the first key for being embedded within timestamped digital data. This unique code is indeterminable outside the timestamping module before receipt of the request to perform a timestamping operation, i.e. before the processor is placed in the second mode of operation with respect to the timestamping key. The unique code is then inserted within each timestamped digital data. For example, each timestamped digital data comprises a timestamp having the unique code inserted within the timestamp. This method allows the authenticity of a timestamp to be verified by verifying the timestamp for authenticity and by verifying the unique code associated with the key used for performing the timestamp operation. Since the unique code is only published once the processor is within the second mode of operation with respect to the timestamping key, there is no way to create a timestamp with the unique number before it is published other than a brute force approach—timestamping every possible unique number. Of course, selection of a sufficiently large unique code or some other form of unique code will prevent brute force attacks from being effective. Preferably, the unique code is sufficiently large to dissuade brute force attacks.

Further preferably, the secure encryption key and the processor are provided within a secure module and the unique code is indeterminable outside the module prior to receipt of the request to perform a timestamping operation.

As is obvious to persons of skill in the art, there are numerous ways to generate a unique code. Examples for generating the unique code include generating the unique code based on the secure encryption key, generating the unique code based on a random number, and generating the unique code based on a real time indicative of a time instance a first request to perform a timestamping operation has been received or a combination.

Figure 2A:
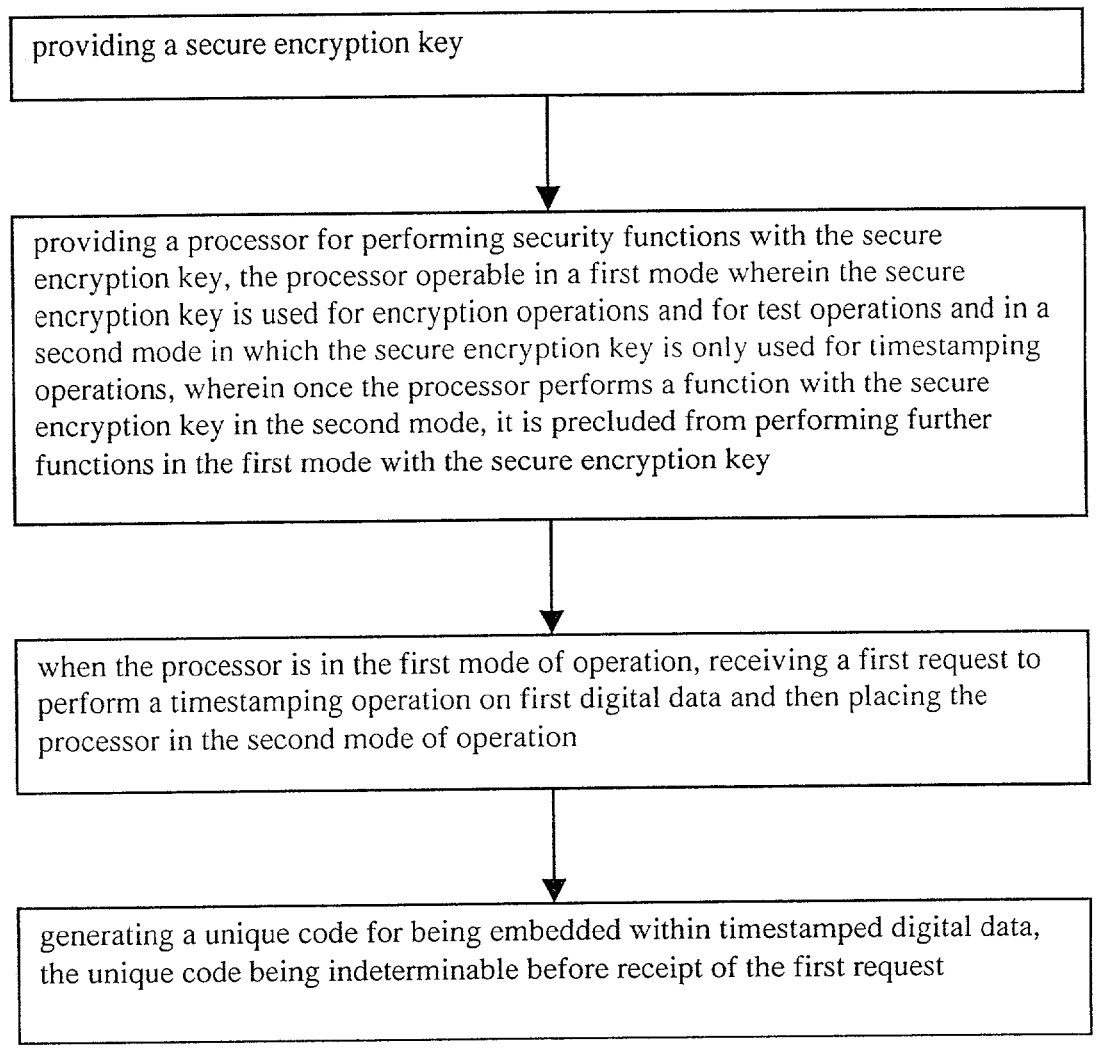
FIG. 2a is a simplified flow diagram of a method for securely timestamping digital data according to the invention.
Figure 2B:
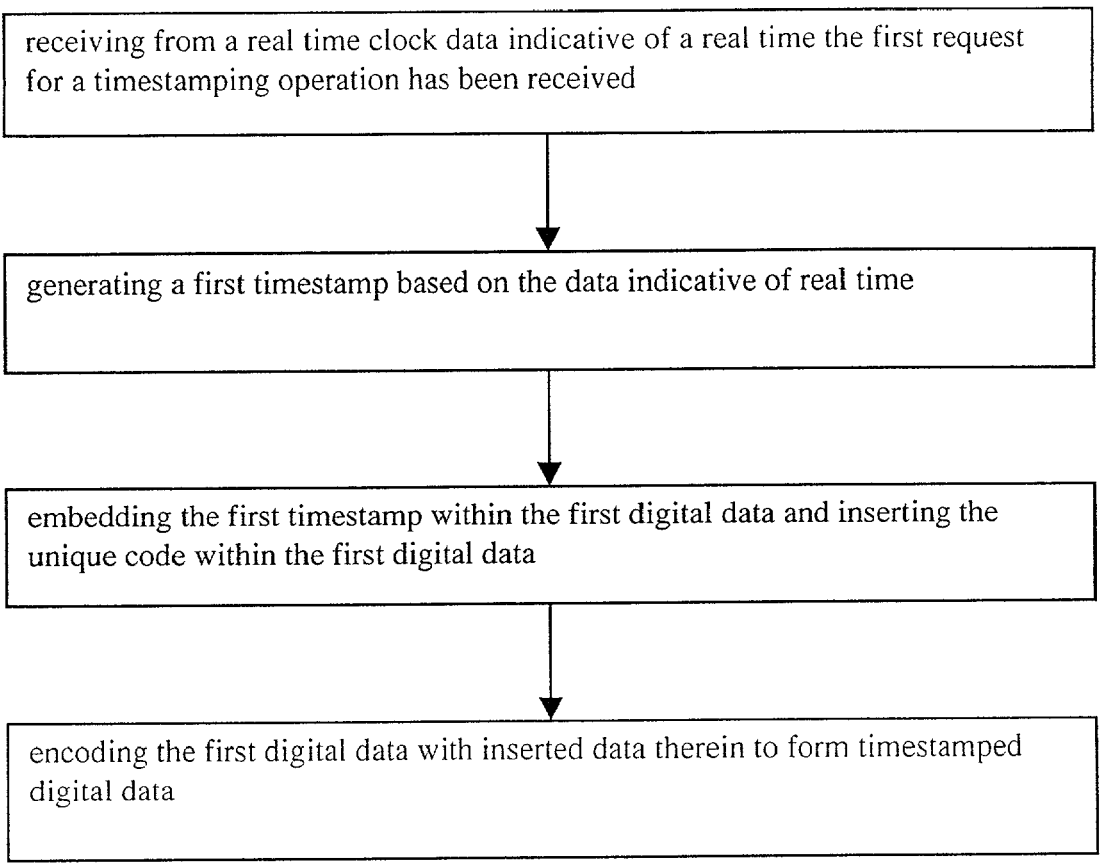
FIG. 2b is a simplified flow diagram of a method for securely timestamping digital data according to the invention.
Figure 2C:
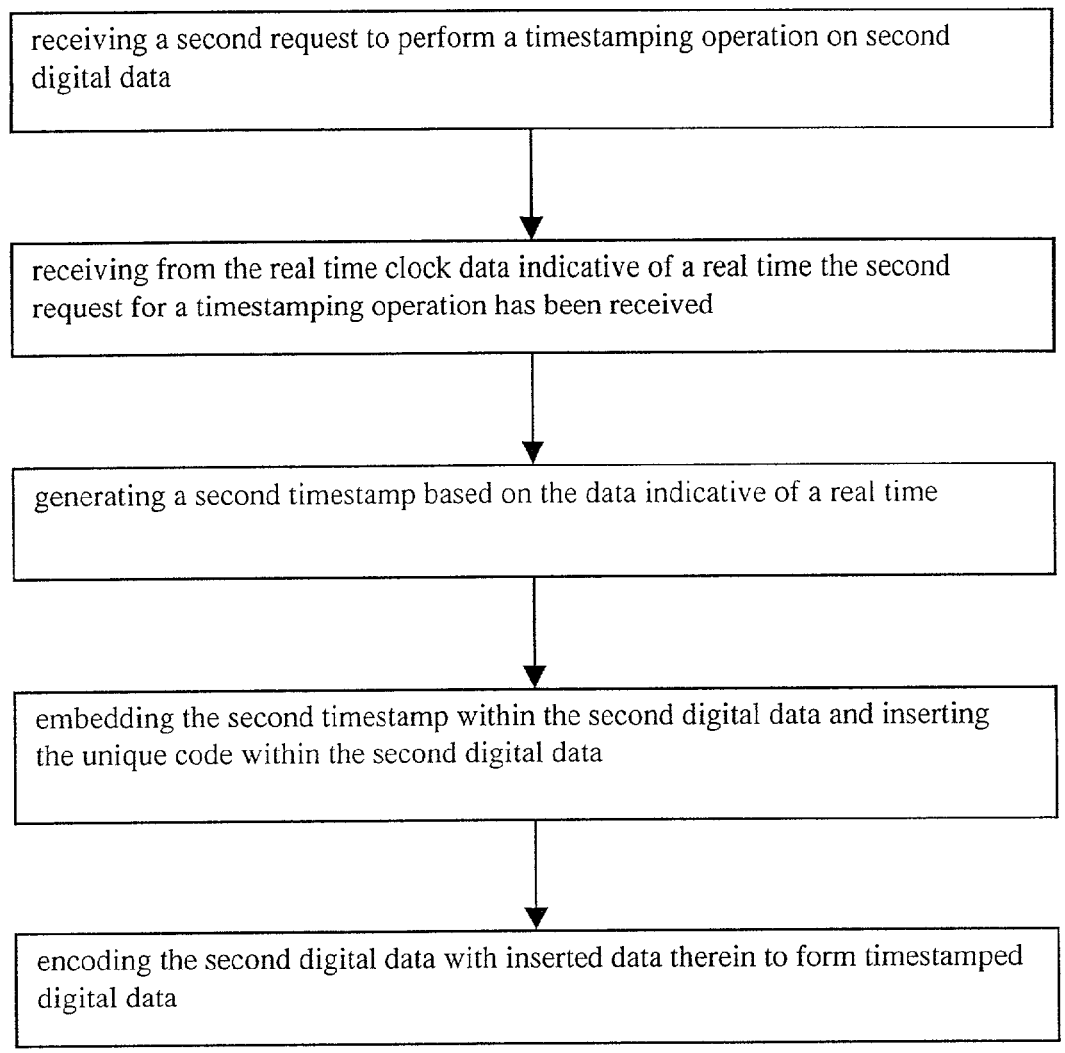
FIG. 2c is a simplified flow diagram of a method for securely timestamping digital data according to the invention.

Referring to FIGS. 2a-2c, simplified flow diagrams of a method for securely timestamping digital data according to the invention are illustrated. Here the above method for securing timestamping of digital data according to the invention is applied to provide secure timestamping operations. A secure encryption key is provided within a timestamping module. The timestamping module comprises a processor for performing security functions with the secure encryption key. The processor is operable in a first mode wherein the secure encryption key is used for encryption operations and for test operations and in a second mode in which the secure encryption key is only used for timestamping operations. Once the processor performs a function with the secure encryption key in the second mode it is precluded from performing further functions in the first mode with the secure encryption key. When the processor receives a first request to perform a timestamping operation on first digital data while in the first mode of operation, the processor is automatically placed in the second mode of operation. After the processor has been placed in the second mode of operation a unique code for being embedded within timestamped digital data is provided; for example, the unique code is generated based on the private key and the time when the operation is requested. Therefore, the unique code is indeterminable before receipt of the first request.

Alternatively, the unique code is generated before receipt of the first request and stored within a secure module only accessible by the processor.

Data indicative of a real time value of the first request for a timestamping operation is then provided to the processor from a real time clock, shown in FIG. 2b. Based on the data indicative of a real time value, a first timestamp is generated using the real time value. The first timestamp is embedded within the first digital data, a portion thereof, or a hash thereof and the unique code is inserted within the first digital data. The first digital data with the inserted data therein are then encoded to form timestamped digital data.

Optionally, the step of encoding the first digital data includes the step of encrypting the digital data with the secure encryption key.

Referring to FIG. 2c a simplified flow diagram of a secure timestamping operation according to the invention is shown. Here, a second request to perform a timestamping operation on second digital data is received. Therefore, the processor is now in the second mode of operation after receipt of the first request, shown in FIGS. 2a and 2b. Data indicative of a real time value of the second request for a timestamping operation are provided to the processor from the real time clock. Based on the data indicative of the real time value a second timestamp is generated. The second timestamp is embedded within the second digital data and the unique code is inserted within the second digital data. The second digital data with the inserted data therein are then encoded using the encryption key to form timestamped digital data.

Figure 3A:
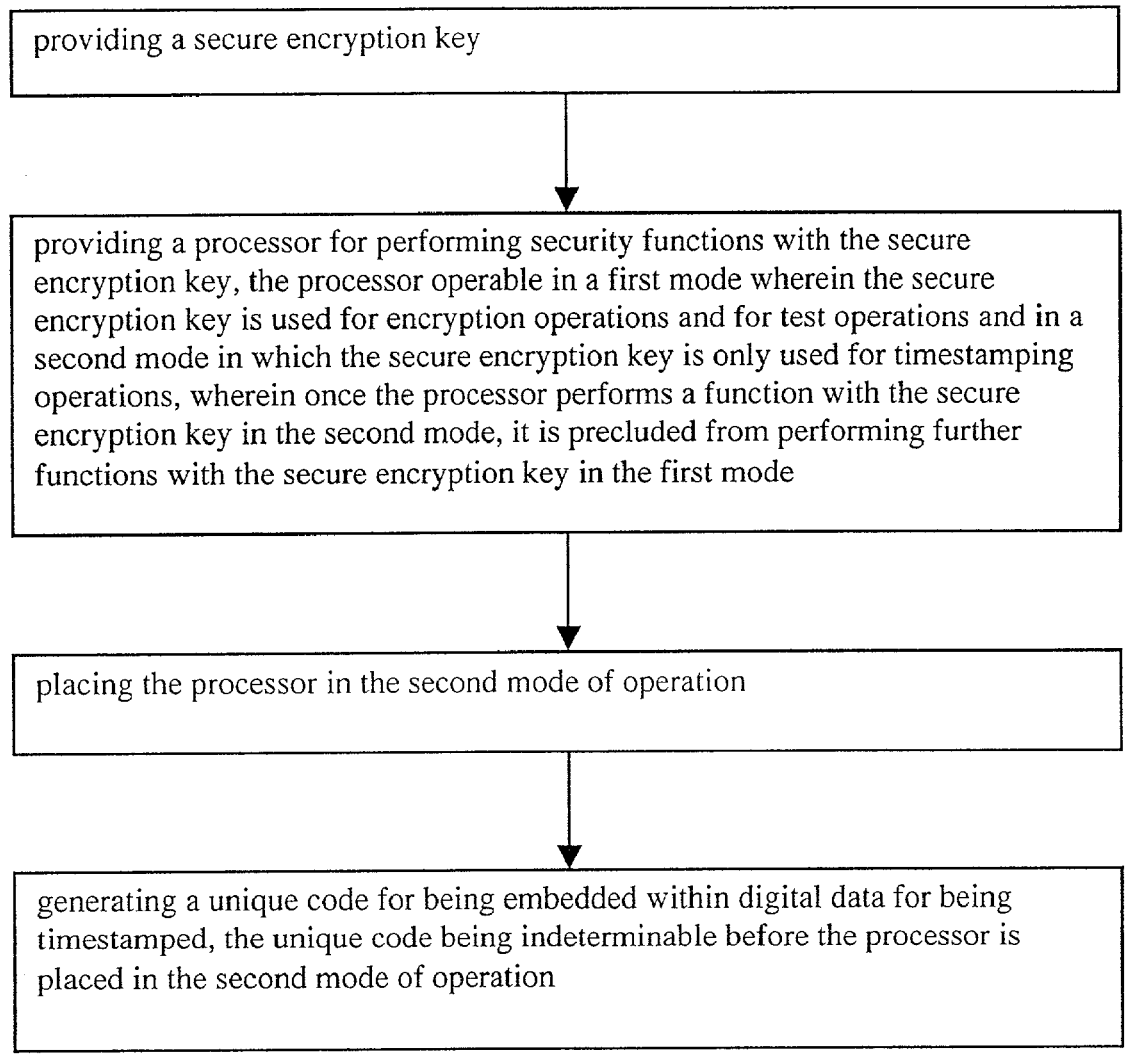
FIG. 3a is a simplified flow diagram of another method for securely timestamping digital data according to the invention.

Other embodiments of a method for securely timestamping digital data according to the invention are illustrated in the simplified flow diagrams of FIGS. 3a-3d. Here, the processor is placed in the second mode of operation before receipt of a first request to perform a timestamping operation as shown in FIG. 3a, for example, by setting a flag indicating a time instance for placing the processor in the second mode. After the processor is placed in the second mode of operation the unique code for being embedded within timestamped digital data is generated and/or provided.

Figure 3B:
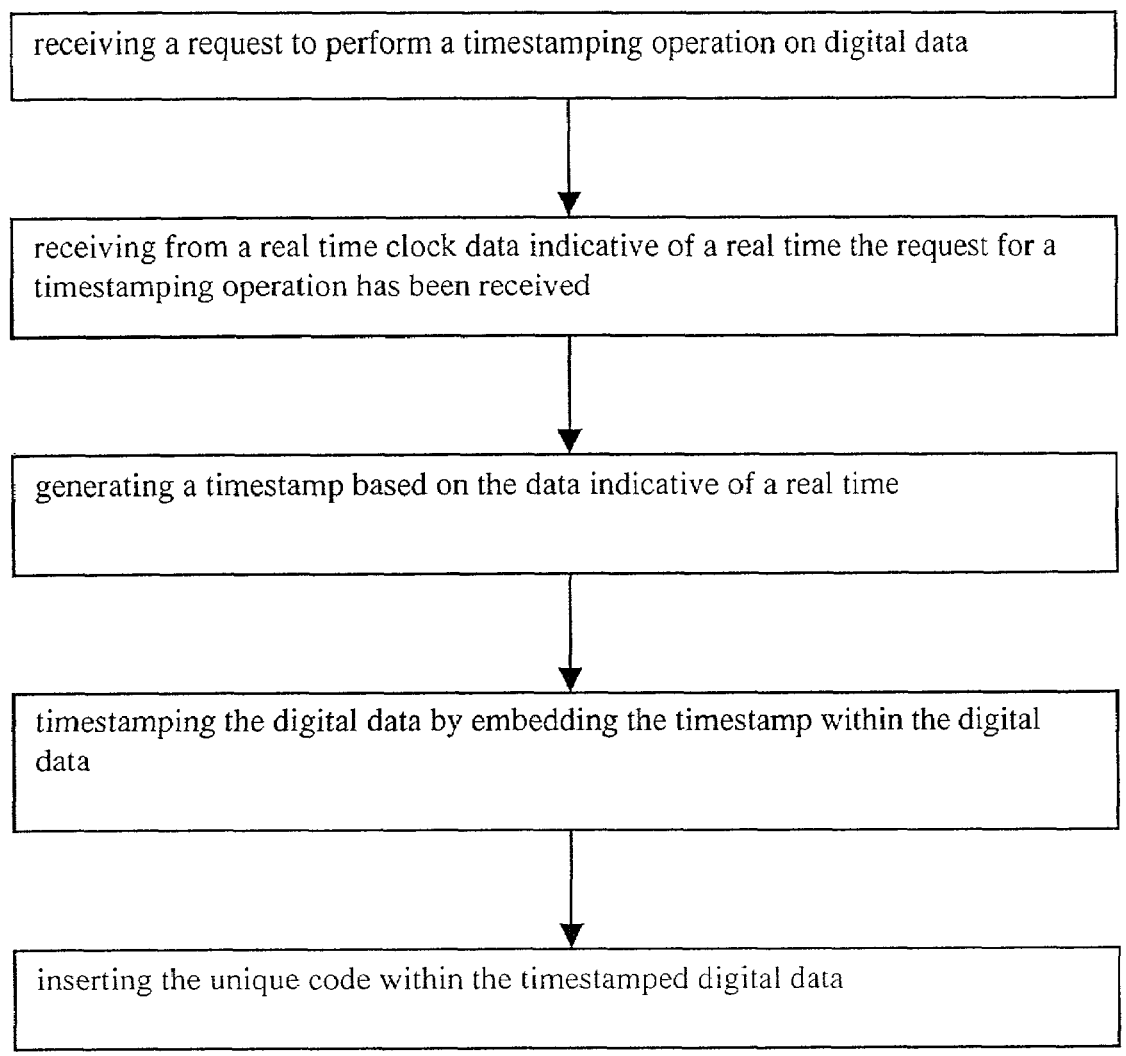
FIG. 3b is a simplified flow diagram of another method for securely timestamping digital data according to the invention.

Referring to FIG. 3b a method for securely timestamping digital data according to the invention is shown. A request to perform a timestamping operation on digital data is received. Data indicative of a real time value of the request for a timestamping operation is provided from a real time clock. A timestamp based on the data indicative of the real time value is generated. The digital data are then timestamped by embedding the timestamp within the digital data. In the last step the unique code is inserted within the data which is then encoded to form a timestamp.

Figure 3C:
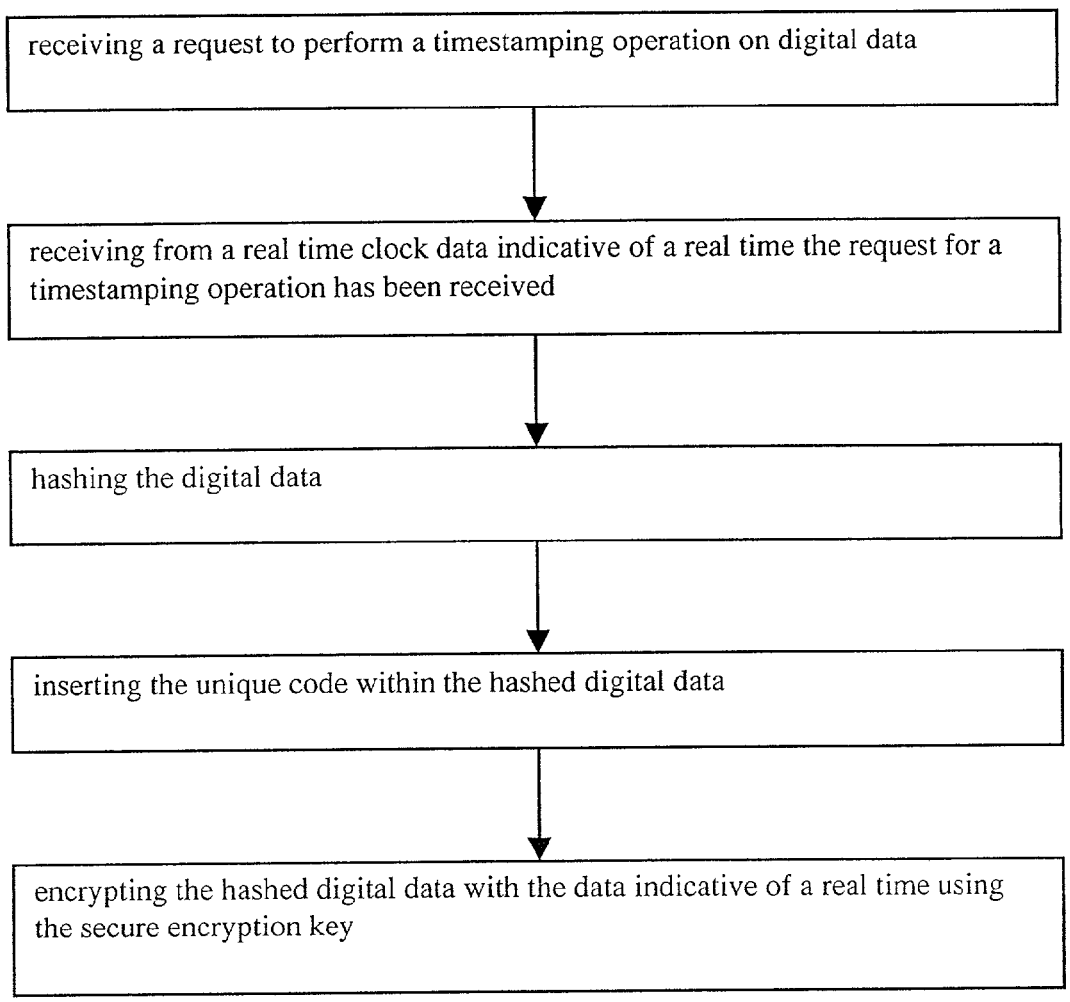
FIG. 3c is a simplified flow diagram of an embodiment of the method for securely timestamping digital data according to the invention illustrated in FIG. 3b.

Referring to FIG. 3c another method for securely timestamping digital data according to the invention is shown. A request to perform a timestamping operation on digital data is received. Data indicative of a real time value based on a time of the request for a timestamping operation from a real time clock. The digital data are then hashed and after inserting the unique code the hashed digital data are encrypted with the data indicative of the real time using the secure encryption key.

FIG. 4 illustrates a simplified flow diagram of the processing of securely timestamped digital data according to the invention. Upon receipt of the securely timestamped digital data the timestamp is decrypted using a key corresponding to the secure encryption key for providing time data in dependence thereupon. In the following step the unique code is retrieved from the securely timestamped digital data. The unique code is then compared with reference data in order to produce a comparison result, and if the comparison result is indicative of a match authenticity of the time data is indicated. This process of verifying the time data is essentially same for timestamped digital data provided by using the various embodiments according to the invention disclosed above. As is evident to persons of skill in the art, there are numerous methods to provide the reference data for verifying the time data. For example, the timestamping module or a timestamping authority provides the reference data to a recipient of the timestamped digital data where the data are processed to produce a comparison result. Alternatively, the recipient transmits the retrieved unique code to the timestamping authority for verification.

Figure 5:
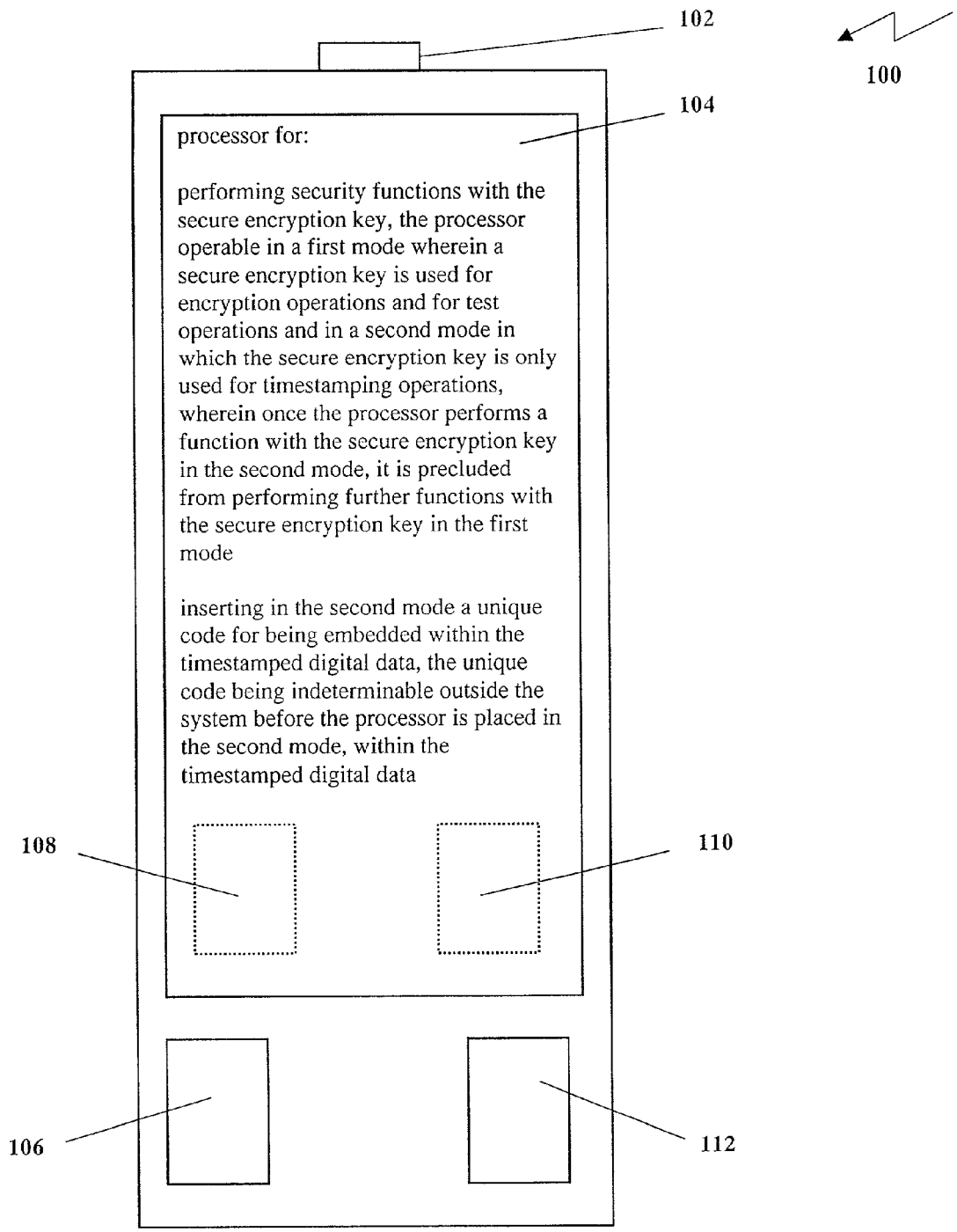

Referring to FIG. 5 a secure system 100 for securely timestamping digital data according to the invention is shown. The system 100 comprises at least a port 102 for receiving the digital data and for providing the timestamped digital data. The timestamping operation is performed using a processor 104. The processor is operable in a first mode wherein a secure encryption key is used for encryption operations and for test operations and in a second mode in which the secure encryption key is only used for timestamping operations. Once the processor performs a function with the secure encryption key in the second mode, it is precluded from performing further functions with the secure encryption key in the first mode. During the timestamping operation in the second mode the processor 104 inserts a unique code within the timestamped digital data. The unique code is indeterminable outside the system before the processor is placed in the second mode. The unique code is generated by the processor 104 or, alternatively, received from another processor when placed in the second mode. The system 100 further comprises a real time clock 106 for providing data indicative of a real time.

Optionally, the processor 104 further comprises circuitry 108 for generating a secure encryption key. Further optionally, the processor 104 comprises circuitry 110 for generating a random number.

Further optionally, the system 100 comprises secure memory 112 for storing the secure encryption key inaccessible outside of the secure system but accessible to the processor for performing security functions therewith.

The methods and system for securely timestamping digital data according to the invention overcomes the drawbacks of the prior art by providing means to a recipient of timestamped data to reliably verify the authenticity of same as shown above, thus rendering attempts to tamper timestamps futile. The invention provides means for reliably establishing the date of any electronic document such as digital representations of readable text but also of video, audio, and pictorial data increasing security for the exchange of digital data between parties of a transaction. Therefore, with the increasing use of the Internet for numerous business transactions secure timestamping of digital data is essential to establish credibility in such transactions.

Numerous other embodiments of the invention will be apparent to persons skilled in the art without departing from the spirit and scope of the invention as defined in the appended claims.

What is claimed is:

1. A method for securing timestamping of digital data comprising the steps of:
providing a secure encryption key; and,
providing a processor for performing security functions with the secure encryption key, the processor operable in a first mode wherein the secure encryption key is used for encryption operations and for test operations and in a second mode in which the secure encryption key is only used for timestamping operations,
wherein once the processor performs a function with the secure encryption key in the second mode, it is precluded from performing further functions in the first mode with the same secure encryption key.

2. A method for securing timestamping of digital data as defined in claim 1, comprising the steps of:
receiving a request to perform a timestamping operation; and,
placing the processor in the second mode of operation once the request is received.

3. A method for securing timestamping of digital data as defined in claim 2, comprising the step of:
generating a unique code for being embedded within timestamped digital data, wherein the secure encryption key and the processor are within a secure module and wherein the unique code is indeterminable outside the secure module prior to receipt of the request.

4. A method for securing timestamping of digital data as defined in claim 2, comprising the step of generating a unique code for being embedded within timestamped digital data, the unique code being indeterminable before receipt of the request.

5. A method for securing timestamping of digital data as defined in claim 4, wherein the unique code is inserted within each timestamped digital data.

6. A method for securing timestamping of digital data as defined in claim 5, wherein each timestamped digital data comprises a timestamp, and wherein the unique code is encoded within the timestamp.

7. A method for securing timestamping of digital data as defined in claim 3, wherein the unique code is generated based on the secure encryption key.

8. A method for securing timestamping of digital data as defined in claim 3, wherein the unique code is generated based on a random number.

9. A method for securing timestamping of digital data as defined in claim 3, wherein the unique code is generated based on a real time value indicative of a time instance a first request has been received.

10. A method for securely timestamping digital data comprising the steps of:
providing a secure encryption key;
providing a processor for performing security functions with the secure encryption key, the processor operable in a first mode wherein the secure encryption key is used for encryption operations and for test operations and in a second mode in which the secure encryption key is only used for timestamping operations, wherein once the processor performs a function with the secure encryption key in the second mode, it is precluded from performing further functions in the first mode with the secure encryption key;
when the processor is in the first mode of operation, receiving a first request to perform a timestamping operation on first digital data and then placing the processor in the second mode of operation; and,
providing a unique code for being embedded within timestamped digital data, the unique code being indeterminable before receipt of the first request.

11. A method for securely timestamping digital data as defined in claim 10, comprising the steps of:

receiving from a real time clock data indicative of a real time the first request for a timestamping operation has been received;

generating a first timestamp based on the data indicative of real time using the secure encryption key;

embedding the first timestamp within the first digital data and inserting the unique code within the first digital data; and, encoding the first digital data with inserted data therein to form timestamped digital data.

12. A method for securely timestamping digital data as defined in claim 11 wherein encoding includes the step of encrypting the digital data with the secure key.

13. A method for securely timestamping digital data as defined in claim 12, comprising the steps of:

receiving a second request to perform a timestamping operation on second digital data;

receiving from the real time clock data indicative of a real time the second request for a timestamping operation has been received;

generating a second timestamp based on the data indicative of a real time using the secure encryption key;

embedding the second timestamp within the second digital data and inserting the unique code within the second digital data; and, encoding the second digital data with inserted data therein to form timestamped digital data.

14. A method for securely timestamping digital data comprising the steps of:

providing a secure encryption key;

providing a processor for performing security functions with the secure encryption key, the processor operable in a first mode wherein the secure encryption key is used for encryption operations and for test operations and in a second mode in which the secure encryption key is only used for timestamping operations, wherein once the processor performs a function with the secure encryption key in the second mode, it is precluded from performing further functions with the secure encryption key in the first mode;

placing the processor in the second mode of operation; and, providing a unique code for being embedded within timestamped digital data, the unique code being indeterminable before the processor is placed in the second mode of operation.

15. A method for securely timestamping digital data as defined in claim 14, comprising the steps of:

receiving a request to perform a timestamping operation on digital data;

receiving from a real time clock data indicative of a real time value that the request for a timestamping operation has been received;

generating a timestamp based on the data indicative of a real time using the secure encryption key;

embedding the timestamp within the digital data;

inserting the unique code within the timestamped digital data; and, encoding the digital data with the unique value and the timestamp embedded therein to form timestamped digital data.

16. A method for securely timestamping digital data as defined in claim 14, comprising the steps of:

receiving a request to perform a timestamping operation on digital data;

receiving from a real time clock data indicative of a real time the request for a timestamping operation has been received;

hashing the digital data; and, encrypting the hashed digital data with the data indicative of a real time using the secure encryption key.

17. A method for securely timestamping digital data as defined in claim 16, comprising the step of inserting the unique code within the hashed digital data prior to encryption thereof.

18. A secure system for securely timestamping digital data comprising:

at least a first port for receiving the digital data and for providing timestamped digital data; and a processor for:

performing security functions with a secure encryption key, the processor operable in a first mode wherein the secure encryption key is used for encryption operations and for test operations and in a second mode in which the secure encryption key is only used for timestamping operations, wherein once the processor performs a function with the secure encryption key in the second mode, it is precluded from performing further functions with the secure encryption key in the first mode.

19. A system for securely timestamping digital data as defined in claim 18, comprising: a real time clock for providing data indicative of a real time.

20. A system for securely timestamping digital data as defined in claim 19, wherein the processor comprises circuitry for generating the secure encryption key.

21. A system for securely timestamping digital data as defined in claim 20, wherein the processor comprises circuitry for generating a pseudo-random number forming a unique value associated with an encryption key, the unique value for being embedded within each timestamp formed with the associated key, the unique value being indeterminable outside the system before the processor is placed in the second mode.

22. A system for securely timestamping digital data as defined in claim 20, comprising secure memory for storing the secure encryption key inaccessible outside of the secure system but accessible to the processor for performing security functions therewith, wherein within the memory is stored a unique value associated with an encryption key, the unique value for being embedded within each timestamp formed with the associated key, the unique value being indeterminable outside the system before the processor is placed in the second mode.

23. A system comprising:

a processor that processes a secure encryption key, said processor being operable in a first mode that processes the secure encryption key in encryption operations, and in a second mode that processes the secure encryption key in timestamping operations, wherein once the processor processes the secure encryption key in the second mode, the processor is precluded from processing the secure encryption key in the first mode.

* * * * *